US010776493B2

(12) United States Patent
Laffey et al.

(10) Patent No.: US 10,776,493 B2
(45) Date of Patent: Sep. 15, 2020

(54) SECURE MANAGEMENT AND EXECUTION OF COMPUTING CODE INCLUDING FIRMWARE

(71) Applicant: HEWLETT PACKARD ENTERPRISE DEVELOPMENT LP, Houston, TX (US)

(72) Inventors: Thomas M. Laffey, Roseville, CA (US); Ludovic Emmanuel Paul Noel Jacquin, Bristol (GB); Nigel Edwards, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 105 days.

(21) Appl. No.: 16/159,365

(22) Filed: Oct. 12, 2018

(65) Prior Publication Data

US 2020/0117804 A1    Apr. 16, 2020

(51) Int. Cl.
*G06F 21/57* (2013.01)
*H04L 9/32* (2006.01)
*G06F 1/24* (2006.01)

(52) U.S. Cl.
CPC .............. *G06F 21/575* (2013.01); *G06F 1/24* (2013.01); *G06F 21/572* (2013.01); *H04L 9/3236* (2013.01); *G06F 2221/033* (2013.01)

(58) Field of Classification Search
CPC .......... G06F 21/24; G06F 21/575; G06F 1/24; G06F 2221/033; H04L 9/3236
See application file for complete search history.

(56) References Cited

U.S. PATENT DOCUMENTS

| 7,984,286 | B2 * | 7/2011 | Zimmer | G06F 21/575 |
| | | | | 713/155 |
| 8,103,909 | B2 | 1/2012 | Hanna | |
| 2004/0076043 | A1 | 4/2004 | Boals et al. | |
| 2010/0131694 | A1 * | 5/2010 | Kelly | G06F 12/0246 |
| | | | | 711/102 |
| 2017/0147356 | A1 | 5/2017 | Kotary et al. | |

(Continued)

OTHER PUBLICATIONS

Moor Insights & Strategy, "Comprehensive Server Restoration with Hewlett Packard Enterprise," Feb. 2018, pp. 1-8.

*Primary Examiner* — Brian T Misiura
(74) *Attorney, Agent, or Firm* — Hewlett Packard Enterprise Patent Department

(57) ABSTRACT

Secure management of computing code is provided herein. The computing code corresponds to computing programs including firmware and software that are stored in the memory of a computing device. When a processor attempts to read or execute computing code, a security controller measures that code and/or corresponding program, thereby generating a security measurement value. The security controller uses the security measurement value to manage access to the memory. The security measurement value can be analyzed together with integrity values of the computing programs, which are calculated while holding the reset of the processor. The integrity values indicate the validity or identity of the stored computing programs, and provide a reference point with which computing programs being read or executed can be compared. The security controller can manage access to memory based on the security measurement value by hiding or exposing portions of the memory to the processor.

18 Claims, 7 Drawing Sheets

(56) References Cited

U.S. PATENT DOCUMENTS

2018/0096154 A1* 4/2018 Shivanna .............. G06F 21/577
2018/0165455 A1  6/2018 Liguori et al.
2019/0073478 A1* 3/2019 Khessib ................ G06F 9/4401

* cited by examiner

US 10,776,493 B2

SECURE MANAGEMENT AND EXECUTION OF COMPUTING CODE INCLUDING FIRMWARE

BACKGROUND

Computing devices include memory for storing computing programs that are executed by its processor. The computing programs stored in the memory of the computing device include firmware, as well as backup and alternate programs. When the computing device is reset in response to receiving a reset signal, the processor is programmed to fetch the firmware from the memory and execute it as the initial step in a boot process. The processor in turn fetches, from the memory, instructions and data corresponding to other computing programs, and executes those programs during its operational state.

BRIEF DESCRIPTION OF THE DRAWINGS

Certain examples are described in the following detailed description and in reference to the drawings, in which.

DETAILED DESCRIPTION

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

Traditionally, when a reset signal is generated in a computing device, that signal is propagated to the computing device's hardware including its processor. The processor, upon receiving the reset signal, restarts and initiates a boot process. During the boot process, the processor fetches instructions or code from the memory of the computing device, starting with initial boot instructions such as firmware. In turn, other computing programs are read and executed by the processor during the operational state of the computing device.

Notably, using existing techniques, the firmware is automatically fetched from memory by the processor when a reset of the computing device is triggered. The processor executes the firmware without confirming whether the firmware and/or other programs or data stored in the memory of the computing device have been corrupted or otherwise altered. Although alternate or backup programs can be read and executed by the processor, such programs are stored in the memory in the same manner and similarly accessible by the processor and other device. As a result, if the firmware is corrupted, the other programs stored in the memory are possibly or likely to be corrupted as well. In other words, the firmware and other programs and data stored in the memory are similarly susceptible to malicious modifications and corruption. While some existing devices can provide security functionality on behalf of the processor, such devices do not control the reset of the processor, or the communications between the processor and the memory in a manner that causes the processor to execute validated programs and access to the memory to be restricted. Accordingly, there is a need for security controllers that can manage computing code stored in a memory of the computing device.

Computing Device and Firmware Security Controller

Figure 1:
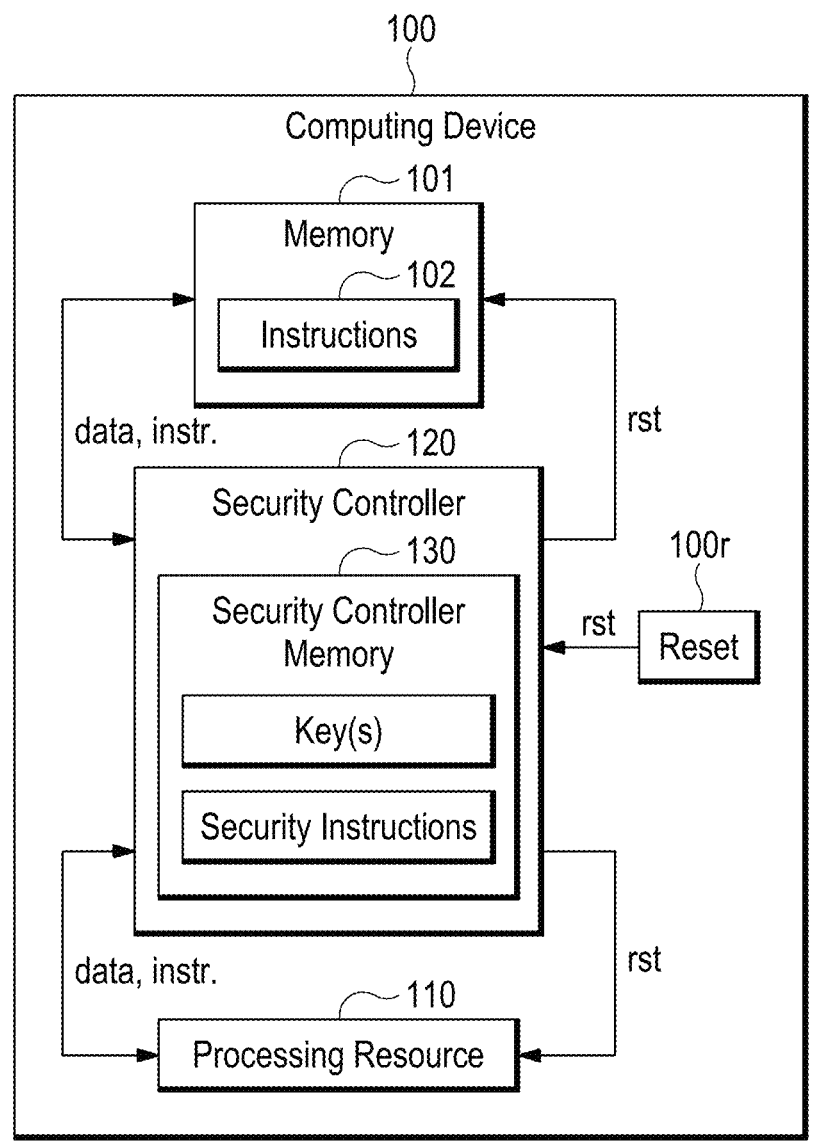
FIG. 1 is a system diagram illustrating an exemplary embodiment of a computing device having a security controller for securely managing and executing computing code.

Referring now to the figures, FIG. 1 is a block diagram of an exemplary embodiment of a computing device 100 in secure management of computing code, including firmware, is provided. As used herein, a computing device can be a server (e.g., a blade server), a computer networking device (e.g., a switch), chip set, desktop computer, workstation, personal device, point of sale (PoS) device, etc., or any other system, processing device or equipment known to those of skill in the art.

As illustrated in FIG. 1, the computing device 100 includes a processing resource 110 and memory 101. In some embodiments, memory 101 refers to non-transitory, machine-readable storage. The memory 101 can include volatile and non-volatile non-transitory media or devices, such as suitable electronic, magnetic, optical, or other physical storage apparatus to contain or store information such as instructions 102 (e.g., machine-readable instruction), related data, and the like. Non-exhaustive examples of memory 101 include one or a combination of a storage drive (e.g., a hard drive), flash memory, non-volatile random access memory (NVRAM) any type of storage disc (e.g., a Compact Disc Read Only Memory (CD-ROM), random access memory (RAM), dynamic random access memory (DRAM), cache, registers and the like. While the memory 101 is shown in exemplary FIG. 1 as being inside of the computing device 100, it should be understood that the memory medium or component can be physically separate from the computing device 100 and instead communicatively coupled thereto, such that it is accessible to various components including to the security controller (described in further detail below) of computing device 100. Moreover, it should be understood that all or a portion of the memory 101 can be provided on or physically separate from the processing resource 110.

Instructions 102 are stored (e.g., encoded) on the memory 101, and are executable by or on behalf of the processing resource 110. The processing resource 110 can be, for example, one or a combination of a central processing unit (CPU), a semiconductor-based microprocessor, a digital signal processor (DSP) such as a digital image processing unit, or other hardware devices or processing elements suitable to execute or cause to execute instructions (e.g., instructions 102) stored in a memory or storage media. The processing resource 110 can include one or multiple processing cores on a chip, multiple cores across multiple chips, multiple cores across multiple devices, or suitable combinations thereof. In some embodiments, the processing resource 110 can be configured to fetch, decode, and execute instructions such as the instructions 102 shown in FIG. 1.

The instructions 102 can be a part of or form computing programs, applications and software. In some embodiments, the instructions 102 can be or include beginning booting instructions (or "boot code"), an operating system, applications that run with the environment of the operating system, and others known to those of skill in the art. As used herein, "beginning booting instructions" include instructions stored in the memory 101 that are configured to be accessed and executed first (before other instructions) following the computing device 100 being reset or powered on. In some embodiments, the computing device 100 is booted in response to a reset (or "power on") signal or command, causing hardware and/or software of the computing device to restart. As shown in FIG. 1, the computing device 100 can include a reset 100r, which can be a button, switch, or similar input component. Non-limiting examples include a reset generator (e.g., ADM6711) equipped with a button input that is configured to monitor, among other things, power supply voltages for the computing device 100. When the reset 100r is activated (e.g., pressed), it causes the reset signal to be supplied, for example, to one or more of the hardware components coupled thereto, such as the security controller 120. It should be understood that a reset can be triggered by a reset signal, command or process initiated by a local or a remote component or device.

Returning to the instructions 102, beginning booting instructions can include instructions that, when run, can cause various tasks to be executed. These tasks can include initializing hardware components of the computing device 100 and ensuring that all expected hardware is identified and functioning properly; loading of an operating system and/or performing security techniques and services. For example, the beginning booting instructions can cause verification of other instructions or code stored on the memory 101 (or other machine-readable storage medium accessible to processing resource 110), to ensure that it is secure (e.g., not corrupt). In some embodiments, beginning booting instructions can be or include at least a core root of trust (e.g., an initial boot loader, extended boot loader, etc.). In some embodiments, beginning booting instructions can be, include or refer to firmware (e.g., Unified Extensible Firmware Interface (UEFI) and the like (e.g., basic input/output system (BIOS)), as known to those of skill in the art. It should be understood that the instructions 102 can include any number of instructions that together make up a computing program, application or software, or any number of instruction each corresponding to a single program.

Still with reference to FIG. 1, the computing device 100 includes a security controller 120. The security controller 120 can be implemented in various forms such as an application-specific integrated circuit (ASIC), a chipset, a processor, or other controllers known to those of skill in the art. For example, the security controller can include dedicated hardware (e.g., integrated circuit (IC), other control logic, other electronic circuits, or suitable combinations thereof that include a number of electronic components) to perform a particular action and/or function. In other words, the security controller 120 can include dedicated, interconnected logic elements that process signals and data. In some embodiments, the security controller 120 is logically positioned in between the processing resource 110 and the memory 101, such that communications between the processing resource 110 and the memory 101 are routed or relayed through the security controller 120. Though, as described in further detail below, the processing resource 110 may be unaware of the presence of the security controller 120.

In one example embodiment illustrated in FIG. 1, the security controller 120 includes security controller memory 130. The security controller memory 130 can include one or more volatile and/or non-volatile memory devices. The security controller memory 130 can store security instructions and data for validating the security of other instructions (e.g., firmware and other programs) stored in the memory 101, and allowing secure execution thereof, as described in more detail with reference to exemplary embodiments provided below. For instance, in some embodiment, the security instructions stored in the security memory 130 can be executed by the security controller 120 to generate a security measurement value (or "integrity value") for a specific set of instructions or data. In some embodiments, the secure management performed by the security instructions can be provided for using hardware-based logic. In such cases, the security instructions are not stored in or executed from the security controller memory 130. Hardware-based logic relies on dedicated hardware (e.g., integrated circuit (IC), other control logic, other electronic circuits, or suitable combinations thereof that include a number of electronic components) to perform particular actions and/or functions such as secure management of computing code. That is, in some embodiments, the security controller includes dedicated, interconnected logic elements that process signals and data as opposed to retrieving and executing instructions from the security controller memory 130.

As used herein, a security measurement value can refer to characters (e.g., numeric or alphanumeric) associated with a specific set of data or instructions. Accordingly, in some embodiments, a security measurement value can be associated with, for example, the beginning booting instructions. In some embodiments, a security measurement value associated with a specific instance of beginning booting instructions is unique to that specific instruction or data set, such that a security measurement value associated with another instance of beginning booting instructions (or any other instructions or data) would be different. The security measurement value associated with a specific instruction or data set can therefore be used to identify and/or verify that specific instruction or data set.

In some embodiments, a security measurement value can be generated using various techniques known to those of skill in the art including cryptographic hash functions. Accordingly, the security measurement value can be characterized as a cryptographic security measurement value. A cryptographic hash function can map a data set of arbitrary size (e.g., a set of instructions) to a data of fixed size (e.g., a hash value or security measurement value). Non-limiting and non-exhaustive examples of cryptographic hash functions include those of the Secure Hash Algorithm (SHA) family (e.g., SHA-1, SHA-256, SHA-512, SHA-3, etc.), MD5, and others known to those of skill in the art. While various cryptographic hash functions may be used, in some examples, the cryptographic hash function may be a function with high collision resistance to ensure a unique value for a specific data set. Accordingly, the security controller memory 130 can include or store instructions for generating a security measurement value (e.g., a cryptographic hash value) corresponding to, for example, beginning booting instructions included among the instructions 102. In some embodiment, the security controller 120 can perform different types of hashes for a single data set (e.g., instructions).

In this regard, multiple security measurement values can therefore be associated with a single data set, each corresponding to a specific hashing technique. As described in further detail below, measuring different security measurement values for the same data set, program area and/or different version of the program can dictate or indicate something different, such as triggering a different level of access (e.g., to memory) to be permitted to that data set, program area, or program version. As described in further detail below, security measurement values can be stored in the security controller memory 130.

It should be understood that, in some embodiments such as the one illustrated in FIG. 1, the security controller 120 is a separate component or chip, and is operationally screened from the processing resource 110. It should be understood that the security controller 120 and the processing resource 110 (e.g., CPU) can alternatively be provided in the same chip or IC, although operationally screened from one another. For example, in some embodiments, a system on chip (SoC) design or architecture in which multiple components of the computing device 100 can be provided, including a combination of the processing resource 110, the security controller 120 and the memory 101. These components, despite being on the same chip, are nonetheless logically or operationally screened or shielded from one another, such that their ability to communicate with one another is configured as if they are not part of the SoC. Operationally screened refers to the characteristic of the functions and data (e.g., security measurement values) of the security controller 120 being unable to be directly affected by the processing resource 110. For example, operationally screened can mean that the processing resource 110 cannot send a signal to the security controller 120 to undesirably affect or alter what the security controller 120 does or the data that is generated by security controller 120. In some embodiments, operationally screened can also refer to the processing resource 110 being unaware of the functions performed by the security controller 120, such as the security techniques (e.g., generating measurement values) described herein. Moreover, in some embodiments, operationally screened can also mean that the security controller 120 can be undetectable by the processing resource 110— i.e., that the processing resource 110 is unaware of the existence of the security controller 120. Thus, in some embodiments, the security controller 120 can be functionally independent from and unalterable by the processing resource 110 while processing resource 110 processes beginning booting instructions.

Although not illustrated in FIG. 1, the computing device 101 includes communication means (e.g., hardware and/or software, such as a serial bus, through which local and remote devices and components can communicate with one another.

Secure Management and Execution of Computing Code

Figure 2:
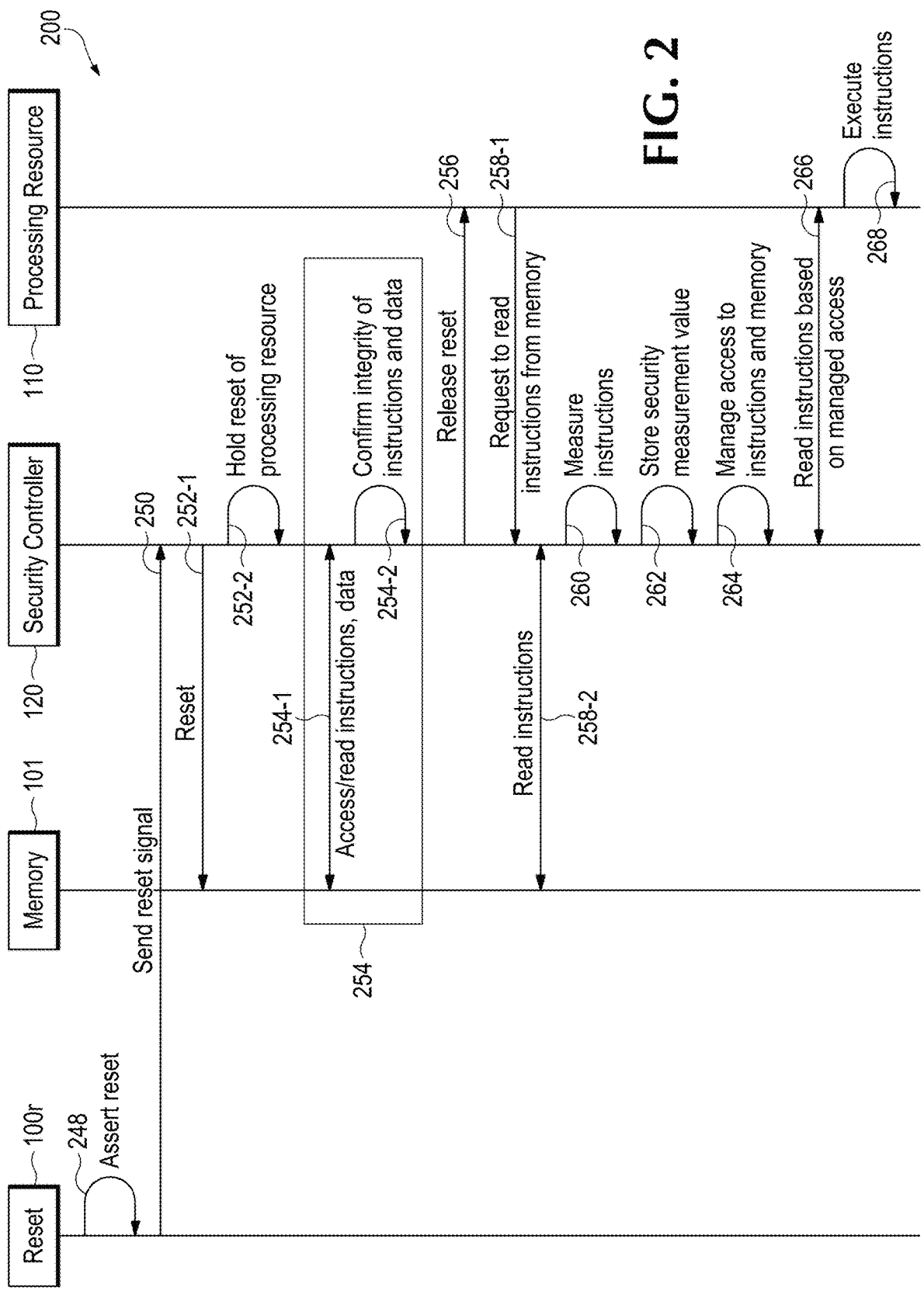
FIG. 2 is a sequence diagram illustrating an exemplary embodiment of a process for securely managing and executing computing code using the security controller of FIG. 1.

FIG. 2 is a sequence diagram illustrating a process 200 for providing secure management of computing instructions and data. The process 200 is described herein with reference to the computing device 100 illustrated in FIG. 1. More specifically, aspects of the exemplary process 200 of FIG. 2 are described with reference to securely executing instructions and data, including instructions that make up firmware and software executable by or on behalf of the processing resource 100.

At step 248, the reset 100r of the computing device 100 is asserted using techniques described above and known to those of skill in the art. In turn, as a result of the asserting of the reset 100r, at step 250 of the process 200, the reset component 100r transmits or activates a reset signals intended to reset selected hardware components of the computing device 100. As described herein and known to those of skill in the art, the reset 100r can be or include dedicated hardware that, when asserted, causes transmission of a reset signal. The reset 100r can be physically housed within or external to the computing device 100. Because the security controller 120 is disposed logically between the reset 100r and the memory 101 and processing resource 110, to reset the hardware of the computing device 100, the transmitted reset signals are sent to the security controller 120, through which it can then be routed to the other hardware. The security controller 120 is caused to be reset.

At step 252-1, the security controller 120 is configured to transmit the reset signal to the memory 101. Although not shown in FIG. 2, the security controller can transmit the reset signal to other interconnected hardware. However, notably, as shown at step 252-2, the security controller 120 holds the processor in a reset state in which it is not executing code nor resetting, by holding or not transmitting the reset signal intended for the processing resource 110. Typically, the processing resource 110, upon receiving a reset signal, automatically boots and executes initial booting instructions (e.g., firmware). Holding the processing resource 110 in reset or in a reset state, e.g., as done in step 252-2, prevents the processing resource 110 from executing code or resetting, and therefore from fetching and executing initial booting instructions. Instead, during that time, in some embodiments, the security controller 120 can perform security measures as described herein, including validating the initial booting instructions and other code prior to being executed by the processing resource 110.

Figure 3:
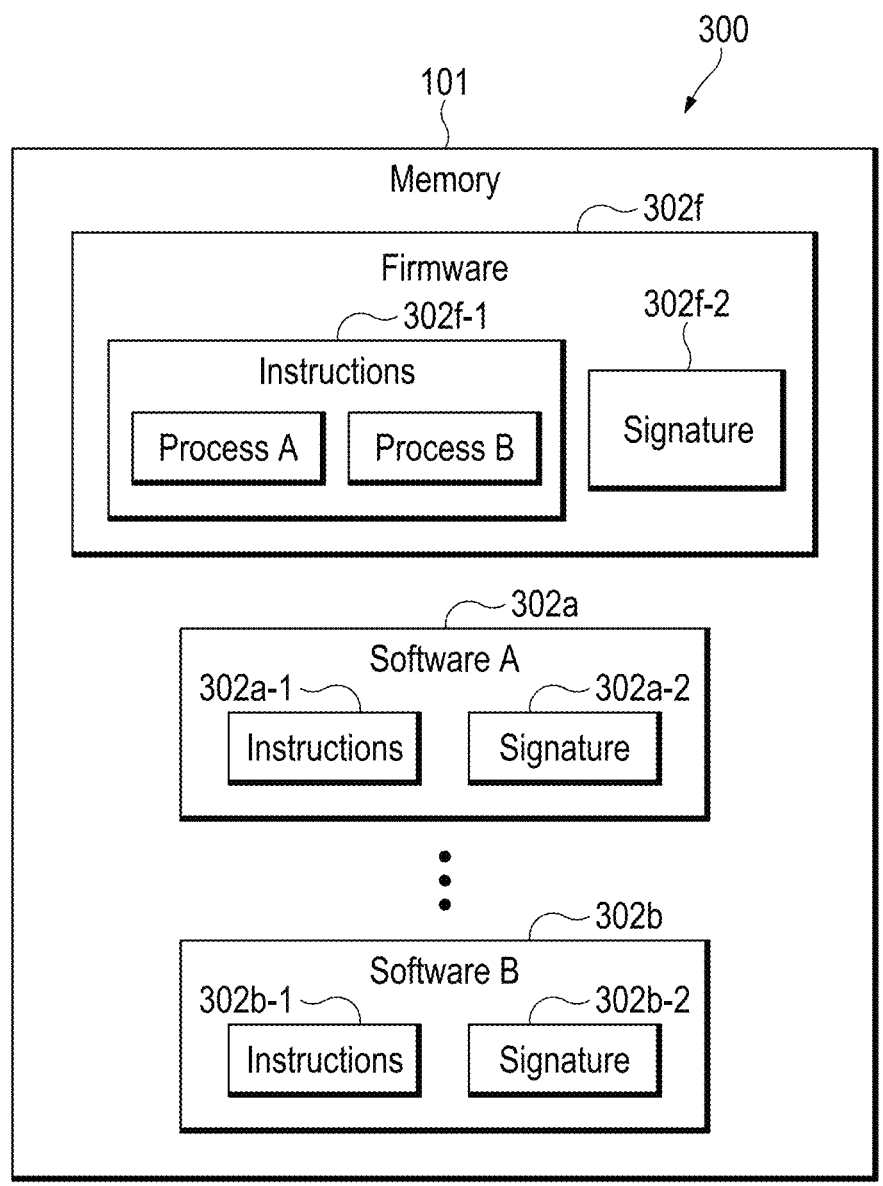
FIG. 3 is a system diagram illustrating an exemplary embodiment of the memory of the computing device of FIG. 1.

At step 254, the security controller 120 validates instructions and/or data stored in the memory 101. As described in further detail below, the validating of instructions and/or data of step 254 can additionally or alternatively be performed when the instructions and/or data stored in the memory are measured (e.g., step 260) when being read by or on behalf of the processing resource 110. The instructions and/or data stored in the memory 101 refers to information stored immediately prior to the reset operation. FIG. 3 is a diagram 300 illustrating information stored in memory 101, according to an exemplary embodiment. The information stored in the memory 101 can include data and instructions made up of code that can be grouped into processes, which can be grouped into computing applications or programs such as firmware 302f, software A 302a, and software B 302b.

In some embodiments, the firmware and software stored in the memory 101 is digitally signed, such that it can be authenticated for safe reading or execution. As known to those of skill in the art, digitally signing a collection of computing code (e.g., firmware) can be performed using cryptographic techniques. In some embodiments, this includes attaching a unique digital signature to the rest of the code (e.g., instructions). For example, the firmware 302f includes instructions 302f-1 and a signature 302f-2. Software 302a and 302b is likewise made up of instructions (302a-1 and 302b-1, respectively) and digital signatures (302a-2 and 302b-2, respectively). Each of the digital signatures can represent an encrypted version of a hash value resulting from a hashing of the code of the firmware or software. As known, the encryption of the hash value—i.e., the creating of the signature and signing of the code—can be performed using a private key (also referred to herein as "firmware/software private key"). The firmware/software private key can be managed by a development system on which the underlying code is generated, and/or other firmware or software provider system. The development system or the like is configured to physically and logically secure the firmware/software private key. As described in further detail below with reference to step 254-2, the firmware and/or software is validated using a corresponding public key (also referred to herein as "firmware/software public key") that is publicly accessible to and/or stored by the computing device 100 (e.g., in memory 101).

Still with reference to FIG. 2, the validating of the instructions and/or data stored in the memory 101, as performed in step 254, includes reading at step 254-1, by the security controller 120, from the memory 101, groups of instructions and data, including firmware 302f and software 302a and 302b. In turn, at step 254-2 of the validating of step 254, the security controller 120 confirms the integrity of the instructions and data read from the memory 101. In one example embodiment with reference to the firmware 302f, confirming its integrity includes obtaining a hash value of the non-signature portion (e.g., the instructions 302f-1) and comparing it to the hash value of the decrypted signature portion 302f-2 of the firmware 302f. As described, decrypting of the signature portion can be performed using the public key.

The resulting hash values are compared and, if they match, the integrity of the firmware 302f stored in the memory 101 can be said to be confirmed. In other words, if the integrity of the firmware 302f stored in the memory 101 is confirmed, it can be said that the firmware 302f that is to be executed by the processing resource 110 is not compromised, corrupted or otherwise altered. It should be understood that similar integrity confirmation processes can be performed not only for the software 302a and 302b, but for other instructions and/or data, in any manner known to those of skill in the art that would indicate that such instructions and/or data, if read or executed by the processing resource 110 would not cause any unwanted or unexpected results.

Moreover, the resulting hash values obtained during the validating of the instructions can be stored. For instance, when the firmware 302f is stored, its generated hash value can be stored by the security controller 120. This hash value corresponding to the firmware 302f is in some instances referred to herein as a security measurement value, and more particularly to an expected security measurement value. Still with reference to the process 200 of FIG. 2, as described below, at step 264, the security controller 120 can provide authorizations and access to portions of the memory 101 based on a security measurement value of the instructions being read or executed during booting or operation of the computing device 100. In some embodiments, the type of access or authorization to be granted is identified by comparing the actual security measurement value (step 260) of the instructions read or executed at steps 258-1 and 258-2 to the expected security measurement values that are obtained and stored at step 254. In this way, the security controller can determine what has been executed and how that compares to known, expected or verified instructions. In some embodiments, the expected security measurement values of the instructions (e.g., firmware, software) and data stored in the memory 101 are recalculated when the computing device 100 is reset or rebooted.

In some embodiments, the validating of step 254 can include validating and/or performing software or firmware updates. That is, at step 254, the security controller 120 can validate code corresponding to an update of software or firmware stored in the memory 101. Moreover, in turn, the update can be run such that software and/or firmware stored in the memory 101 is updated in accordance with the corresponding software or firmware update code. The security controller 120 can validate and/or execute updates based on policies and/or rules indicating the conditions under which (e.g., when, what, etc.) updates are to be performed.

In turn, at step 256, having confirmed the integrity of the contents of memory 101 including the firmware 302f to be executed by the processing resource 110 upon reset, the security controller releases the reset signal held at step 252-2. This causes a reset signal to be transmitted to the processing resource 110, which triggers the reboot of the processing resource 110 and execution of the initial booting instructions—which, in some example embodiments described herein, is the firmware 302f. Notably, the firmware 302f and other code of the memory 101 has been validated at step 254, such that it can be safely executed.

At step 258-1, the processing resource 110 transmits a request to read instructions, for instance, the instructions that make up the firmware 302f. As described above with reference to FIG. 1, the security controller 120 is implemented logically between the processing resource 110 and the memory 101, such that messages transmitted from one to the other are routed by or through the security controller 120. Accordingly, the request to read the instructions of the firmware 302f from the memory 101, transmitted by the processing resource 110 at step 258-1, is received by the security controller 120.

The instructions of the firmware 302f requested to be read by the processing resource 110 are determined based on an instruction queue of the processing resource 110. In some embodiments, upon reboot, the instructions at the top of the instruction queue is the first instruction of the firmware 302.

Figure 4:
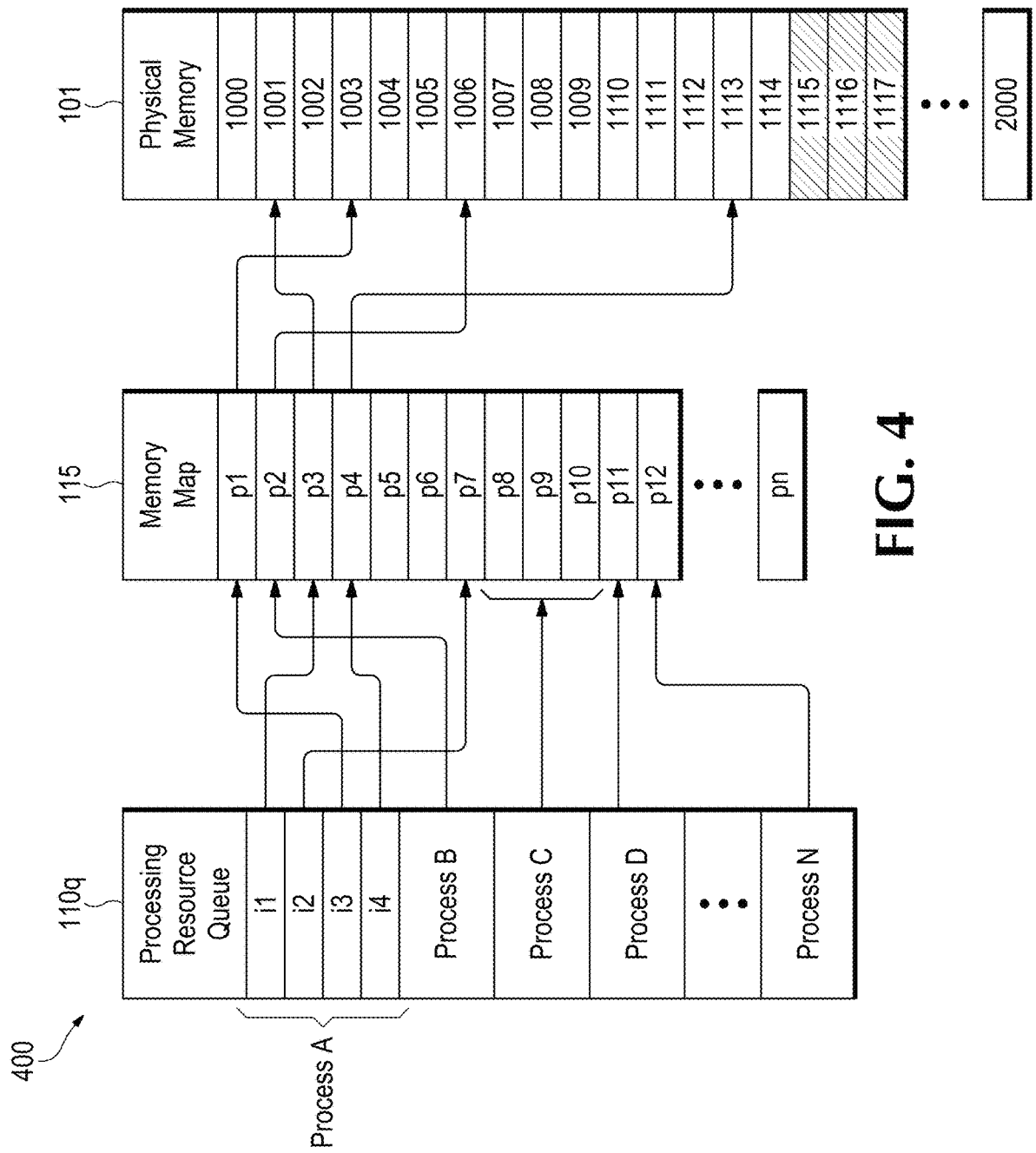
FIG. 4 is a diagram illustrating an exemplary embodiment of a mapping of instructions to the memory of the computing device of FIG. 1.

FIG. 4, is a diagram 400 illustrating a mapping of instructions between the processing resource 110 and the memory 101 of the computing device 100, according to an exemplary embodiment. In FIG. 4, a processing resource queue 110q, which is the instructions queue corresponding to the processing resource 110, includes a number of queued processes, including Process A, Process B, Process C, Process D, . . . , and Process N. The top of the queue 110q represents the first or next process (or instruction) to be executed by the processing resource 110. It should be understood that more or fewer processes can be included in the queue 110q, as known to those of skill in the art.

Each program (e.g., firmware 302f) can be made up of one or more processes, which are made up of one or more instructions (which are formed of computing code). For example, as shown in FIG. 3, the firmware 302f includes a set of instructions 302f-1 that form two processes: Process A and Process B. Returning to FIG. 4, Process A and Process B (which correspond to the firmware 302f) are the first two processes in the queue 110q. For illustrative purposes, Process A is shown in FIG. 4 as including four instructions: i1, i2, i3 and i4. However, it should be understood that processes can be made up of any number of instructions and, although not illustrated in FIG. 4, the other processes B to N also include various instructions.

Accordingly, at step 258-1, upon a reboot, the instructions attempted to be read by the processing resource 110 at step 258-1 are the instructions of Process A and Process B, starting with instruction i1. As described in further detail below, each instruction in the processing resource queue 110q is mapped to a specific portion of the (physical) memory 101 where the code corresponding to each instruction is stored. Such mapping can be performed using a memory map such as the memory map 115 illustrated in FIG. 4. Thus, upon receiving the request to read the instructions of the firmware 302f and/or its first instruction i1, the security controller 120 reads, at step 258-2, those instructions. The instructions of Process A and Process B (i.e., of the firmware 302f) are read by the security controller 120 based on the corresponding physical memory addresses in the memory 101 as mapped in the memory map 115. In other words, at step 258-2, the security controller 120 starts reading instruction i1 from the memory 1003, based on the linkage therebetween shown by the arrows in FIG. 4, and enabled by the memory map 115.

Still with reference to the process of FIG. 2, in turn, at step 260, the security controller 120 measures the instructions read at step 258-2, which are those instructions requested to be read by the processing resource 110 at step 258-1, and which in one exemplary embodiment correspond to the firmware 302f. Thus, the measuring of the firmware 302f, as used herein, refers to a process of generating a hash value of the code of the instructions that make up the firmware 302f. The hash value of the firmware 320f can be generated using one or more hashing algorithms or functions known to those of skill in the art (some of which are described above in further detail). It should be understood that the security controller 120 can be configured to execute one or more hashing algorithms. Accordingly, the result of step 260 is a security measurement value of the firmware 302f (which was attempted or requested to be read by the processing resource 110 for execution) obtained by hashing the code of the firmware 302f.

As described above, the validating of the instructions and/or data of step 254 can be performed in connection with (e.g., proximate or at least partially parallel to) the measurement of step 260. In some embodiments, the instructions being read at steps 258-1 and 258-2 are measured to generate a security measurement value. In addition to, for example, storing that security measurement value for later access as described below, that security measurement value can be used to validate the instructions. That is, the instructions being measured at step 260, which make up or correspond to a computing program such as a signed program, are also be used to check the integrity of the program as described above with reference to FIG. 2. In some embodiments, processing time can therefore be reduced by minimizing the number of reads of the instructions.

In turn, at step 262, the generated security measurement value of the firmware 302f can be stored by or in the memory 101 and/or the security controller 120. The security measurement value generated at step 260 can be stored in connection with a running log or the like, together with relevant information such as timestamps, addresses, users, and the like. The running log or log file can be tamper-resistant to safeguard the measurement value information. To this end, in some embodiments, a log file can be secured using a register that is reset when its corresponding chip, processor or the like is reset. For example, such a register can be a PCR of a trusted platform module (TPM) that is reset when its TPM is reset.

Moreover, the running log, in which the security measurement values are stored, can correspond to a session of operation of the computing device 100, a time period, or any other period of time or operation. The information can be used to, in substantially real time, or subsequent thereto, audit or inspect the system 101. For instance, if a security vulnerability is later encountered, the log of security measurement values measured can be used to identify the instructions and/or code that was read and accessed. Moreover, in some embodiments, the security measurement values can later be accessed to determine, for example, which versions or types of firmware or software are being executed by computing devices (e.g., the computing device 100). This way, if an out-of-date version is identified as having been run, as indicated by the security measurement value, appropriate remedial measures can be performed. It should be understood that the security measurement values can be securely stored by the security controller 120, and/or can be transmitted to other computing systems, devices or components for further maintenance, monitoring and processing.

In some embodiments, measurement values can be signed to indicate their authenticity—e.g., that they were measured by the correct platform, namely the security controller 120. Signing of the measurement values can be done, for instance, when the measurement values are transmitted to other systems—e.g., for auditing and/or analysis. To this end, the signing of the measurement values can be performed ahead of time (e.g., when they are generated, when they are stored) and/or subsequently in preparation for their transmission to others devices. The security controller 120 can sign the measurement values using a private key (also referred to herein as "secure device private key"). The secure device private key indicates and/or represents to others the identity of the security controller 120. The secure device private key is in some instances created at the time or as part of the manufacturing of the security controller 120 and is securely stored by the security controller 120 such that it is not accessible to other systems or devices—e.g., in a dedicated private key space in its security controller memory 130. The signed measurement values can later be validated by other systems using a corresponding secure device public key. The public key can be publicly accessed and/or issued as part of a certificate such as an IEEE 802.1AR Secure Device Identifier certificate. The secure device public key can be used to verify the signature of the signed code, for example, by decrypting the encrypted hash.

In some embodiments, the hashing performed at step 262 can correspond precisely to the portion of memory in which the instructions of the firmware 302f are stored. However, in other example embodiments, the security controller 120 can hash a certain portion of memory that does not perfectly correspond to the code of the instructions that are read. For instance, in some embodiments in which reading of the firmware 302f is requested, the security controller can be configured to hash not only the code of the firmware 302f but also the code of subsequent software to be requested for execution. Moreover, the security controller can hash an entire process, program or range of memory when a certain instruction or byte of code is read. For example, upon reading or attempting to read the instruction i1, the security controller 120 can hash (and obtain a security measurement value) not only the part of the memory 101 having a physical address 1003, but also all of the memory 101 in which the firmware 302f is stored and/or a certain portion of memory (e.g., the first 256 KB). In some embodiments, the security controller 120 can also hash or check unused portions of the memory 101, as opposed to data or code stored in the memory 101. By virtue of checking unused memory, it is possible to detect, for example, corruptions such as use of the memory by malware.

In turn, at step 264, the security controller 120 can modify and/or manage access and authorizations based on the security measurement value generated at step 260. For instance, based on the results of the measuring of step 260, the security controller 120 can control whether certain data is made accessible to the processing resource 110, whether certain versions or images of firmware or software are provided for execution, and the like. In some embodiments, the access and authorization management of step 264 can be performed with respect to the executing of instructions read at steps 258-1 and 258-2 (e.g., firmware) and/or with respect to later read of instructions or data performed during normal operation (e.g., non-booting) of the processing resource 110 and/or computing device 100. This management of access and authorization based on security measurement values is described in further detail below with reference to FIG. 5. Nonetheless, it should be understood that, in some embodiments, in the context of a booting process, certain portions of memory can be hidden or made inaccessible to the processing resource 110 if for instance the measurement value of the firmware or part of the firmware dictates.

In some embodiments, such management can be performed based on policies or the like that indicate access conditions (and/or rules, limits and the like) to the memory 101, portions thereof, and/or sets of data stored thereon. The access conditions provided by the policies are based at least in part on the measurement values. Moreover, it should be understood that policies (and/or the access conditions therein) can be set at the time of manufacturing the computing device and/or the security controller, or can later be configured. Configurable policies can be modified and/or set at a later time prior to, during (e.g., in real time) and/or subsequent to operating the computing device. One illustrative example of a policy indicates which version of one or more applications to execute (e.g., most recent version) or cannot be executed (e.g., the oldest version) when a particular measurement value is obtained at step 260.

Moreover, in some embodiments, the appropriate access and authorization to portions of memory 101 (and/or data or instructions stored thereon) that is granted to the processing resource 110 (and/or to firmware or software being executed thereby) is determined based on a comparison of the actual security measurement value calculated at step 260 and the collection of expected security measurement values calculated at step 254 for the instructions and data stored in the memory 101.

In turn, at step 266, the processing resource 110 reads the instructions first requested to be read at step 258-1. It should be understood that the instructions are relayed to the processing resource 110 by the security controller 120, which as described above is logically implemented between the memory 101 and the processing resource 110. In turn, at step 268, the processing resource 110 executes the instructions read at step 266.

It should be understood that, although illustrated for exemplary purposes as sequential steps in FIG. 2, the steps 250 to 268 can be performed substantially in parallel and/or real time during a reset operation. Moreover, although the process 110 and the memory 101 are shown as communicating with the security controller 120, the computing device 100 is configured such that the interactions of the security controller are transparent. In other words, the processing resource 110 and/or the memory 101 communicate as if the security controller 120 is nonexistent and/or is formed as part of the memory 101.

Moreover, it should be understood that although FIG. 2 illustrates reading and executing one set of instructions (e.g., the firmware 302f) during booting of the computing device 100, the process 200 can continue to execute more instructions (e.g., software 302a, 302b) in accordance with steps 258-1 through 268. That is, at a subsequent time instance after booting, during an operational state of the computing device 100, the processing resource 110 can access another process or set of processes from its queue, and read the corresponding instructions from memory. In the meantime, as the processes and instructions are being relayed from the memory to the processing resource, the security controller 120 can generate security measurement values, store them, and control access to the memory 101, and information stored thereon, accordingly. In some embodiments, the security measurement values are stored by the security controller 120 in the form of a log. This log can serve as a record of all of the instructions and data attempted to be read by the processing resource 110 from the memory 101. Moreover, based on the validating and measurement values that are calculated by the security controller 120, the log can indicate whether invalid instructions were attempted to be read, which portions of memory were exposed or hidden, outdated or corrupt code was attempted to be read and the like. This information included in the log can be transmitted or reported to other devices or components (e.g., the processing resource 110) for analysis and/or auditing. That is, when this information is reported, it is possible to analyze the logged information and determined appropriate actions that should or need to be taken.

Figure 5:
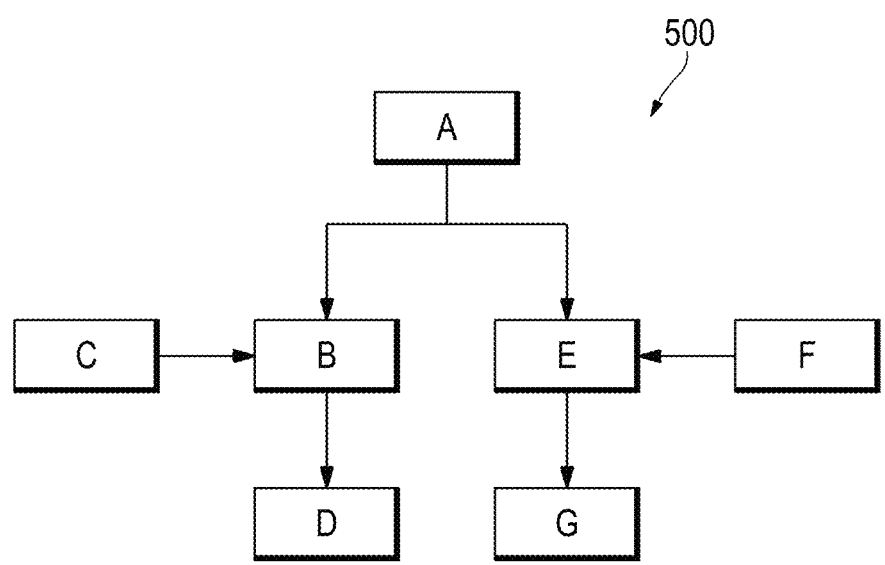
FIG. 5 is a diagram illustrating an exemplary embodiment of a hierarchical representation of regions or portions of the memory of the computing device of FIG. 1.

FIG. 5 is a diagram illustrating a hierarchical representation of an exemplary embodiment of storage regions of the memory 101. The memory 101 can store instructions (e.g., firmware, software) and data, which can be accessed by the processing resource 110. Moreover, access to portions or regions of the memory 101 and/or to instructions and data stored therein can be controlled (e.g., FIG. 2, step 264) by the security controller 120 based upon factors including, for example, security measurement values generated (e.g., FIG. 2, step 260) during reading/execution by the processing resource 110.

In FIG. 5, seven storage regions of the memory 101 are shown, labeled as A to G. Each of these regions can include portions of the memory of varying amounts, which can be contiguous or non-contiguous. Moreover, each of the storage regions A to G can correspond to a specific instruction or to a group of instructions or to configuration data that make up a computer program. For instance, memory region A can include one program, while memory region B includes another program; or memory region A can include a subset of a program and the memory region B includes another subset of that same program. Accordingly, in some embodiments, the security controller can control access to these regions, for example, to shield the processing resource from undesired or unsafe code; to conform with protocols, profiles or configurations that can, among other things, indicate what, when and how instructions and data can be accessed; and/or to restore system failures to "last known good" periods—e.g., during a boot path.

In some example embodiments, the diagram 500 illustrates storage regions of the memory 101 that indicate two alternate boot paths (e.g., of firmware, operating system loader, operating system, configuration data): (1) A+(B and C)+D; and (2) A+(E and F)+G. In the event that the security controller 120 identifies based on the calculated security measurement value (e.g., FIG. 2, step 260) that the instructions being read correspond to those of storage region A followed by storage region B, then regions E, F and G which correspond to the alternate boot path can be hidden from the processing resource 101. The processing resource 101 therefore executes boot path (1), and does so without knowledge or being made aware of the intermediate mapping (e.g., hiding, unhiding) performed by the security controller 120. Moreover, the processing resource 110 does not require any additional code or logic for such a boot path determination and mapping to be performed, as the security controller 120 handles these functions. In another example with reference to FIG. 5, in instances in which two storage regions (e.g., region C and region F) are mutually exclusive of one another, then accessing one of those regions can cause the other to be hidden or made inaccessible to the processing resource. Likewise, from the perspective of the processing resource 110, the mapping that controls hiding or unhiding of e.g., regions C or region F does not require any additional code or logic.

In some embodiments, the security controller 120 can include configurations and policies that dictate what access and authorizations can be provided. For example, if the security controller calculates a security measurement value of firmware that indicates that said firmware is known and trusted (e.g., based on the hash values calculated during validation at step 254), during subsequent operation of the computing device, the trusted firmware that is executing can be granted access to instructions and/or data stored in the memory 101 that may not otherwise be made available. Alternatively or additionally, trusted firmware can be granted access to use a key that can provide the firmware with authentication and/or decryption permissions, such that certain actions can only be performed if approved by the trusted firmware.

In some embodiments, a specific instance of firmware can produce different security measurement values. The security controller can be configured to provide different access levels or conditions based on the security measurement value. Thus, in one instance, the firmware can generate a first security measurement value granting a first set of access rights, while at a second instance, the firmware can generate a second security measurement value generating a second set of access rights.

Controlling access to parts of the memory 101, and therefore to specific firmware, software, and data, can be performed by hiding and unhiding portions or regions of the memory 101 (e.g., not exposing them to the memory map. In some embodiments, access can also or alternatively be controlled by remapping and/or the regions of the physical memory and/or instructions in the memory map. In some embodiments, hiding (or unhiding, remapping) memory regions can be triggered by attempts to access a certain area of the memory (e.g., data stored in that area of the memory), as shown in the process illustrated in FIG. 200. Moreover, hiding, unhiding or remapping memory regions can be triggered by attempts to write into a certain portion of memory and/or attempting to execute certain commands (e.g., boot state transition).

Figure 6A:
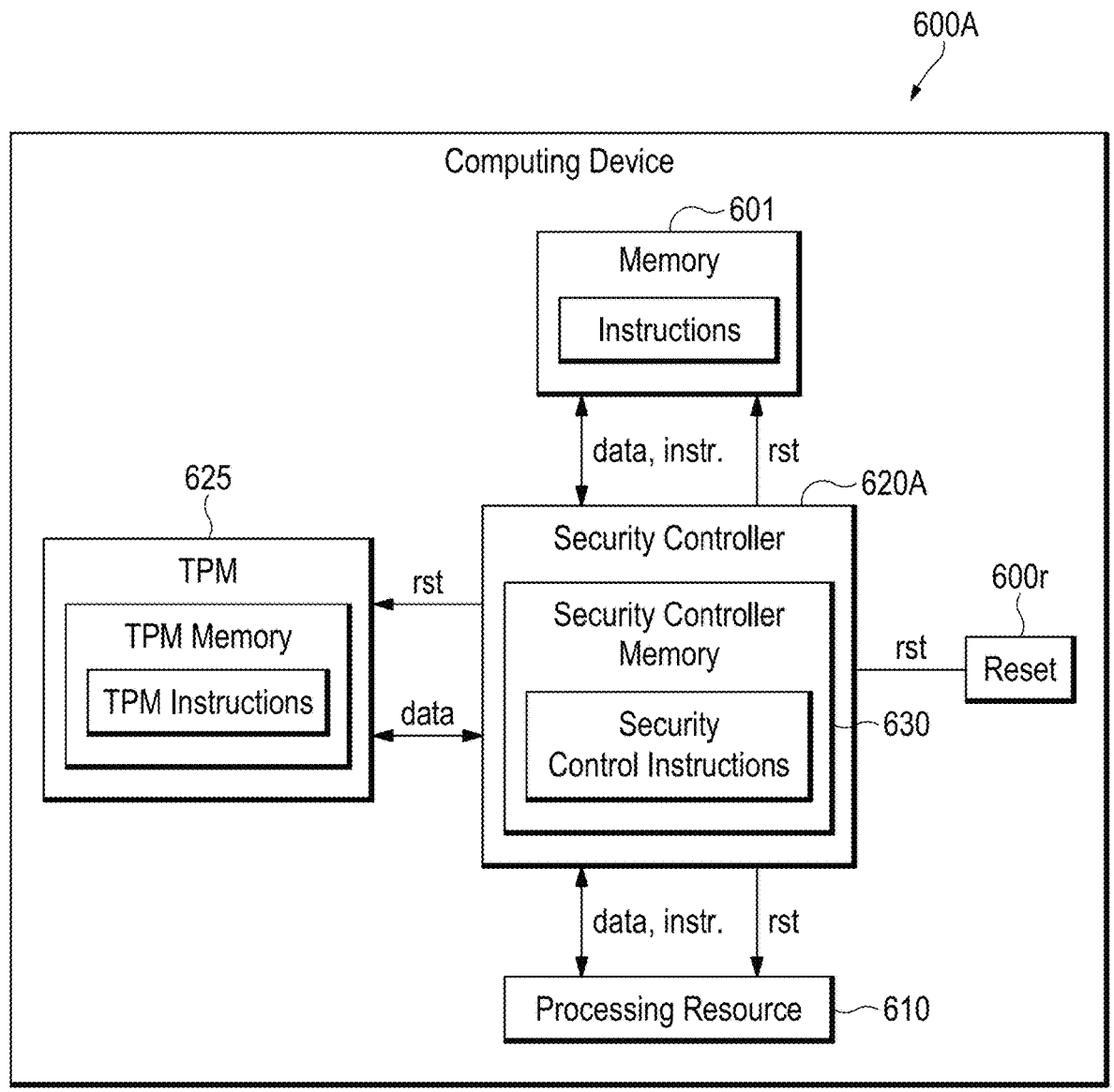
FIG. 6A is a system diagram illustrating an exemplary embodiment of a computing device having a security controller and a trusted platform module (TPM) for securely managing and executing computing code.
Figure 6B:
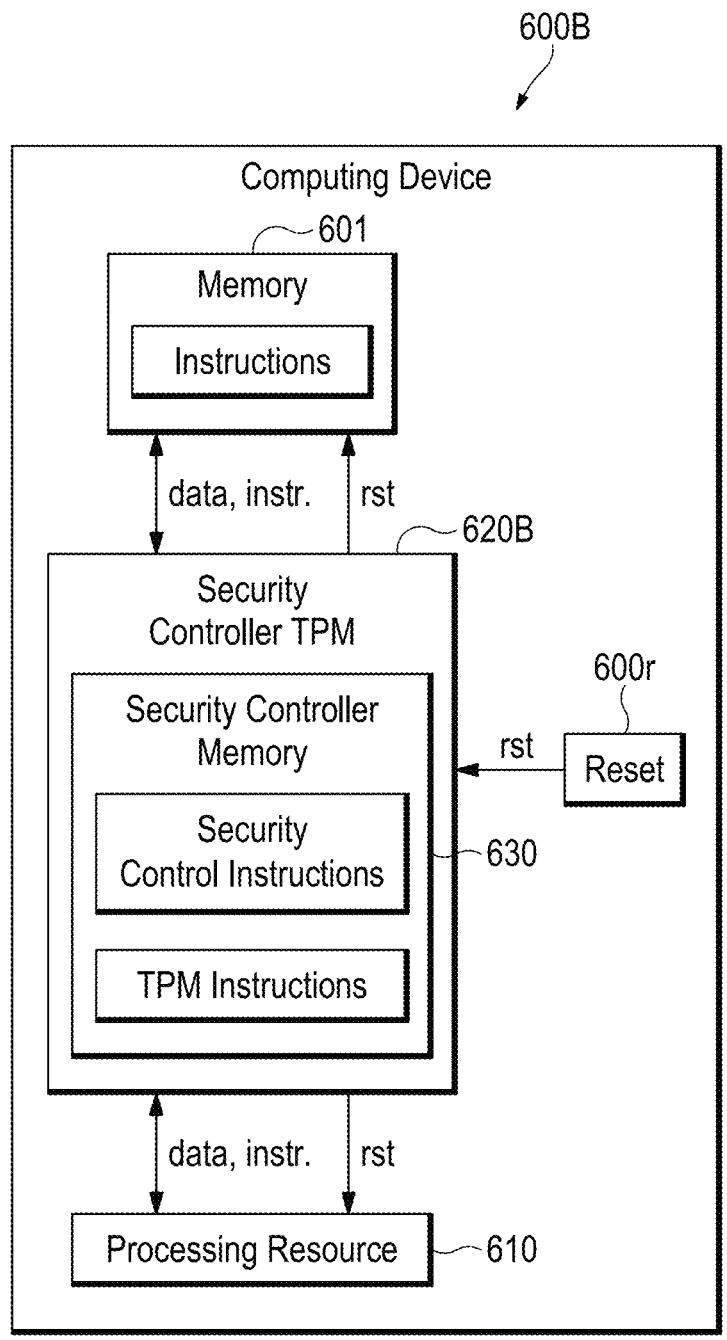
FIG. 6B is a system diagram illustrating an exemplary embodiment of a computing device having a security controller trusted platform module (TPM) for securely managing and executing computing code

FIGS. 6A and 6B illustrate exemplary embodiments of computing devices 600A and 600B for securely managing computing code. The security devices 600A and 600B include reset hardware 600r, memory 601 and processing resource 610, which are substantially similar to reset 110r, memory 101, and processing resource 110 of computing device 100 illustrated in FIG. 1. In contrast, the security devices 600A and 600B are configured to include a trusted platform module (TPM) or TPM functionality for securely managing computing code.

In FIG. 6A, the computing device 600A includes a security controller 620A, communicatively coupled to the reset 600r, the memory 601, and the processing resource 610. The security controller 620A relays communications between the memory 601 and the processing resource 610. Moreover, as described herein, the security controller 620A controls the reset signals transmitted by the reset 600r, such that the security controller 620A can hold hardware such as the processing resource 610 and/or the TPM 625 in reset states by deasserting reset signals thereto. It should be understood that, in FIG. 6A, the TPM 625 and the security controller 620A are provided as different physical hardware components, but are communicatively coupled to one another and configured to communicate such that the TPM 625 can execute its traditional functions while communicating with the processing resource 610 through the security controller 620A, which can execute its functions as described herein. On the other hand, in FIG. 6B, hardware component 620B is a security controller TPM that includes TPM and security controller functionality in a single chip or microcontroller.

In the exemplary embodiments illustrated in FIGS. 6A and 6B, TPM functionality is enabled by the standalone TPM 625 or by the TPM functionality included in the security controller TPM 620B. Such TPM functionality can include providing platform configuration registers, in which security measurement values and other information (calculated by the security controller) can be securely stored; calculating and storing initial measurements of firmware and software (e.g., FIG. 2, step 260) can be performed using hardware core root of trust for measurement (H-CRTM) functionality; protecting certain secure objects stored in the TPM using policies based on secure measurement data obtained by the security controller and TPM based policies; calculating random numbers, for example, to perform hashing operations in connection with confirming the integrity of instructions and data and/or with measuring instructions of data that are read by the processing resource; signing secure measurement values with TPM's keys and mechanisms; and others known to those of skill in the art.

The preceding description has been presented to illustrate and describe examples of the principles described. This description is not intended to be exhaustive or to limit these principles to any precise form disclosed. Many modifications and variations are possible in light of the above teaching.

The invention claimed is:

1. A system for securely managing computing code comprising:
  a processor;
  at least one memory storing one or more sets of instructions executable by the processor, wherein the one or more sets of instructions comprise computing code and correspond to one or more computing programs, the computing programs including at least a first computing program comprising a first set of instructions;
  a security controller configured to store and execute security instructions,
  wherein the processor and the at least one memory are communicatively coupled to the security controller,
  wherein the executing of the security instructions causes the security controller to:
    receive, from the processor, a request to read the first set of instructions from among the one or more sets of instructions stored in the at least one memory;
    generate a security measurement value corresponding to the first set of instructions;
    validate at least the first set of instructions stored in the at least one memory using the generated security measurement value; and
    cause the processor to execute the first set of instructions in accordance with respective controls determined based on the security measurement value of the first set of instructions, and
  wherein the processor is associated with a queue including a plurality of ordered sets of instructions from among the one or more sets of instructions, to be executed, the plurality of ordered sets of instructions including the first set of instructions and a second set of instructions, the first set of instructions to be executed before the second set of instructions, wherein each of the plurality of ordered sets of instructions is mapped to a corresponding region of the memory, and wherein the security measurement value generated for the first set of instructions causes the second set of instructions to be remapped to a different region of the memory, such that the respective controls cause the processor to execute different code for the second set of instructions than prior to the measurement of the security measurement value.

2. The system of claim 1, wherein executing the security instructions additionally causes the security controller to:

hold the processor in a reset state in response to receiving a reset signal, such that the processor does not execute code;

perform the validating of at least the first set of instructions while the processor is held in the reset state;

determine the respective controls under which the first set of instructions are to be executed; and release the processor from the reset state, such that the reset signal to the processor is de-asserted, causing the executing of the first set of instructions.

3. The system of claim 2, wherein the one or more sets of instructions comprise firmware, the firmware including the first set of instructions.

4. The system of claim 1, wherein the one or more computing programs are signed, wherein the security measurement value of the first computing program includes a hash value of the non-signature portion of the first computing program, and wherein the validating of the first computing program includes comparing the hash value of the security measurement value to the decrypted signature with which the first computing program is signed.

5. The system of claim 4, wherein the generated security measurement value of the first computing program is stored by the security controller in a log, the log comprising security measurement values generated by the security controller for a plurality of computing programs requested to be read by the processor during a computing session.

6. The system of claim 5, wherein the executing the security instructions further causes the security controller to transmit a report including at least a portion of the security measurement values in the log, the report being useable to identify anomalies relating to the computing programs associated with the security measurement values in the log.

7. The system of claim 4, wherein the respective controls determined for the first computing program indicate regions of the memory that can be accessed by the processor in connection with the executing of the first computing program.

8. A security controller, comprising:

at least one memory storing security instructions; and a processor configured to execute the security instructions, causing the processor to:

receive a request from a computing device processor to read, from a computing device memory including one or more pluralities of instructions, a first plurality of instructions of a boot process;

generate and store a security measurement value corresponding to each of the first plurality of instructions of the boot process, by performing a hashing function on at least a portion of code of each of the first plurality of instructions;

confirm the integrity of each of the first plurality of instructions based on the security measurement values of the first plurality of instructions;

program access conditions for accessing the computing device memory; and enable the computing device processor to read and execute at least the first plurality of instructions of the boot process according to the access conditions, wherein the access conditions are determined by the processor of the security controller based on one or more of the security measurement values and the result of the confirming of the integrity of the plurality of instructions, and wherein the computing device processor is associated with a queue including a plurality of ordered sets of instructions, from among the one or more pluralities of instructions, to be executed, the plurality of ordered sets of instructions including the first plurality of instructions and a second plurality of instructions, the first plurality of instructions to be executed before the second plurality of instructions, wherein each of the plurality of ordered sets of instructions is mapped to a corresponding region of the computing device memory, and wherein the security measurement value generated for the first plurality of instructions causes the second plurality of instructions to be remapped to a different region of the computing device memory, such that the respective controls cause the computing device processor to execute different code for the second plurality of instructions than prior to the measurement of the security measurement value.

9. The security controller of claim 8, wherein the access conditions control which portions of the computing device memory and information stored thereon can be accessed by the computing device processor.

10. The security controller of claim 9, wherein the security measurement value of the first instructions includes a hash value of the instructions, and wherein the access conditions are determined based on a comparison of the hash value of the instructions of the first instruction and a decrypted signature associated with the first plurality of instructions.

11. The security controller of claim 9, wherein the access conditions cause the processor of the security controller to:

hide or unhide, from the computing device processor, portions of the computing device memory; and/or remap pointers to portions of the computing device memory, wherein the programming of the access conditions includes making accessible to the computing device processor one portion of the computing device memory and making inaccessible or invisible to the computing device processor another portion of the computing device memory.

12. The security controller of claim 9, wherein the access conditions based on the security measurement value of the boot process enable the computing device processor, when executing one plurality of instructions, to access instructions or data stored in portions of the computing device memory that are not accessible to the computing device processor when executing another plurality of instructions.

13. The security controller of claim 9, wherein the processor is further operable to:

store a security log including security measurement values of instructions executed during a session, including at least the security measurement values of the first plurality of instructions, the security log thereby indicating the instructions read by the computing device processor during the session; and transmit the security log for analysis; and based on the analysis of the security log, modify at least a portion of the computing device memory and/or the information stored therein.

14. The security controller of claim 9, further comprising instructions for performing trusted platform module (TPM) functions including one or more of heightened storage security.

15. A computing device comprising:
the security controller of claim 9, including the computing device processor and the computing device memory; and
a trusted platform module (TPM) communicatively coupled to the security controller and configured to provide secure storage and TPM security functions on behalf of the security controller.

16. A method for secure management of computing code, comprising:
receiving a command to reset a processor;
while holding the processor in a reset state, validating one or more of computing programs comprising one or more sets of instructions, including at least a first computing program comprising a first set of instructions, updates and data stored in the computing device memory, the validating including generating and storing integrity values for each of the computing programs, updates, data and/or other unused portions of the computing device memory;
releasing the processor from the reset state, causing the reset command to be transmitted the processor;
receiving, from a processor, a request to read code stored in the computing device memory for executing the first computing program;

generating and storing a security measurement value for the first computing program; and controlling access to the computing device memory based on the security measurement value of the first computing program, by hiding or unhiding portions of the computing device memory and/or modifying a mapping to the computing device memory, and wherein the processor is associated with a queue including a plurality of ordered sets of instructions, from among the one or more sets of instructions, to be executed, the plurality of ordered sets of instructions including the first set of instructions and a second set of instructions, the first set of instructions to be executed before the second set of instructions, wherein each of the plurality of ordered sets of instructions is mapped to a corresponding region of the computing device memory, and wherein the security measurement value generated for the first set of instructions causes the second set of instructions to be remapped to a different region of the computing device memory, such that the respective controls cause the processor to execute different code for the second set of instructions than prior to the measurement of the security measurement value.

17. The method of claim 16, wherein the controlling of the access to the computing device memory is performed based on one or more stored policies that indicate, specifically for the security measurement value of the first computing program, which of the portions of the computing device memory to hide, unhide or remap.

18. The method of claim 17, wherein the one or more stored policies are configurable such that they can be set or modified multiple times to indicate the appropriate access to the computing device memory for security measurement values.

* * * * *